United States Patent [19]

Wachi

[11] Patent Number: 5,015,932
[45] Date of Patent: May 14, 1991

[54] ACTUATOR DRIVING CIRCUITS

[75] Inventor: Shigeaki Wachi, Tokyo, Japan

[73] Assignee: Sony Corporation, Kitashinagawa, Japan

[21] Appl. No.: 530,340

[22] Filed: May 30, 1990

[30] Foreign Application Priority Data

Jun. 1, 1989 [JP] Japan ............................... 1-137436

[51] Int. Cl.$^5$ .................... H02K 33/16; G11B 7/00
[52] U.S. Cl. .................................. 318/560; 318/561; 318/594; 318/603; 360/77.02; 360/78.04
[58] Field of Search ............................. 318/560-636; 360/77.02, 78.04, 78.05, 78.06, 78.07; 369/32, 33, 44.25, 44.32, 44.36

[56] References Cited

U.S. PATENT DOCUMENTS

| | | | |
|---|---|---|---|
| 4,516,178 | 5/1985 | Lee | 360/78.04 |
| 4,777,418 | 10/1988 | Furue | 318/603 |
| 4,955,010 | 9/1990 | Nabeshima et al. | 360/78.04 |

Primary Examiner—Paul Ip
Attorney, Agent, or Firm—Lewis H. Eslinger

[57] ABSTRACT

An actuator driving circuit for a servocontrol system comprises an amplifier for amplifying an error signal obtained in the servocontrol system to produce a driving signal supplied to the actuator, a power supply voltage source for producing a first power supply voltage and a second power supply voltage higher the first power supply voltage, a power supply voltage selector for selecting one of the first and second power supply voltages so as to supply the amplifier with the selected one of the voltages, and a level detector for detecting a specific portion of the error signal having such a level as to cause the amplifier to produce a portion of the driving signal having a level limited to be constant under a condition in which the first power supply voltage is supplied to the amplifier and for producing a detection output by which the power supply voltage selector is controlled to select the second power supply voltage in place of the first power supply voltage when the specific portion of the error signal is detected.

9 Claims, 5 Drawing Sheets

ACTUATOR DRIVING CIRCUITS

BACKGROUND OF THE INVENTION

1. Field of the Invention

The present invention relates generally to actuator driving circuits employed, for example, in for recording information signals on or reproducing information signals from an optical disc, and more particularly, is directed to improvements in a circuit for driving an actuator which is operative to actuate, for example, a focus control unit, a tracking control unit or a head shifting unit provided in an apparatus for recording information signals on or reproducing information signals from an optical disc.

2. Description of the Prior Art

There has been proposed an optical disc recording and reproducing apparatus for recording an information signal such as a video or audio signal on an optical disc and reproducing the information signal from the optical disc. One example of the optical disc recording and reproducing apparatus proposed previously is constituted as shown in FIG. 1.

In FIG. 1, an optical disc 1 on which an information recording area is provided is rotated by a spindle driving motor 2 at a predetermined rotational speed. An optical head device 3 is provided to cause a light beam to impinge upon the information recording area of the optical disc 1 and a recording and reproducing circuit 4 is connected to the optical disc 1 for supplying the optical head device 3 with a recording signal and for obtaining a reproduced information signal based on information read from the optical disc 1 by the optical head device 3. Further, a signal processing circuit 5 which is operative to process the reproduced information signal and supply a signal input and output circuit 6 with the reproduced information signal processed therein and to process an input record signal applied thereto through the signal input and output circuit 6 and supply the recording and reproducing circuit 4 with the input record signal processed therein.

A focus servocontrol block 7 is provided for controlling an actuator for focus control contained in the optical head device 3 in response to a focus error signal obtained from the recording and reproducing circuit 4, and a tracking servocontrol block 8 is provided for controlling an actuator for tracing control contained also in the optical head device 3 in response to a tracking error signal obtained from the recording and reproducing circuit 4. A head shifting block 9 is also provided for shifting the position of the optical head device 3 in a direction of the radius of the optical disc 1 in response to a control signal obtained from the tracking servocontrol block 8.

Further, A controller 10 which may be constituted by a microcomputer is provided for controlling each of the recording and reproducing circuit 4, signal processing circuit 5, signal input and output circuit 6, focus servocontrol block 7, tracking servocontrol block 8 and heads shifting block 9.

In such an optical disc recording and reproducing apparatus, it is generally preferable to apply a low power supply voltage to circuits for processing various signals and various control circuits so that each of the circuits is caused to operate by the low power supply voltage with reduced power consumption. However, particularly in the tracking servocontrol block 8, when a tracking actuator driving circuit which is operative to move an objective lens contained in the optical head device 3, through which the light beam impinges upon the optical disc 1, in the direction of the radius of the optical disc 1 for tracking servocontrol is arranged to operate with the low power supply voltage, the operation of the tracking actuator driving circuit is attended with a disadvantage that the moving speed of the optical lens in the optical head device 3 is reduced to be relatively low and therefore a period required for shifting the light beam impinging upon the optical disc 1 by a track jump operation so as to cause the same to form a light beam spot at a desired position on the optical disc 1 is undesirably increased.

In view of this, there has been also proposed a circuit arrangement for driving actuators contained in an optical head device in which different power supply voltages are applied to actuator driving circuits under a condition wherein normal servocontrol operations are carried out and under a condition wherein the track jump operation is carried out, respectively, as disclosed in the Japanese patent application published before examination under the publication number 64-8515. FIG. 2 shows the circuit arrangement thus proposed previously.

Referring to FIG. 2, a focus error signal Ef is supplied through an amplifier 11 to a focus actuator driving circuit 13 which is operative to drive an electromagnetic coil Lf of an actuator contained in an optical head 16 for focus servocontrol in accordance with the focus error signal Ef supplied thereto. Similarly, a tracking error signal Et is supplied through an amplifier 12 to a tracking actuator driving circuit 14 which is operative to drive an electromagnetic coil Lt of an actuator contained in the optical head 16 for tracking servocontrol in accordance with the tracking error signal Et supplied thereto. Further, the tracking error signal Et amplified by the amplifier 12 is supplied to a low pass filter (L.P.F.) 18 which produces a control signal Sh based on the tracking error signal Et and the control signal Sh obtained from the low pass filter 18 is supplied to a head driving circuit 15 which is operative to drive a motor Mh for moving the optical head 16 in a direction of the radius of an optical disc, upon which a light beam from the optical head 16 impinges, in accordance with the control signal Sh supplied thereto.

In addition to the above, a power supply voltage generator 19 is provided for producing a first power supply voltage V1 and a second power supply voltage V2 which is higher than the first power supply voltage V1. One of the first and second power supply voltages V1 and V2 is selected by a switching circuit 17 to be applied to each of the focus actuator driving circuit 13, the tracking actuator driving circuit 14 and the head driving circuit 15. The switching circuit 17 to which a switching control signal Ss is supplied is operative to select the first power supply voltage V1 for applying the same to each of the focus actuator driving circuit 13, the tracking actuator driving circuit 14 and the head driving circuit 15 when the switching control signal Ss represents a first operating condition wherein the tracking actuator driving circuit 14 is working for a normal tracking servocontrol operation and to select the second power supply voltage V2 for applying the same to each of the focus actuator driving circuit 13, the tracking actuator driving circuit 14 and the head driving circuit 15 when the switching control signal Ss represents a second operating condition wherein both of the tracking actuator driving circuit 14 and the head driving circuit 15 are working for the track jump operation.

Therefore, in the circuit arrangement shown in FIG. 2, each of the focus actuator driving circuit 13, the tracking actuator driving circuit 14 and the head driving circuit 15 is supplied with the first power supply voltage V1 which is relatively low so as to operate with reduced power consumption when the normal tracking servocontrol operation is carried out and with the second power supply voltage V2 which is relatively high so that the light beam impinging upon the optical disc is able to be quickly moved into a desired position on the optical disc when the track jump operation is carried out.

However, when an optical disc recording and reproducing apparatus which employs the circuit arrangement for driving actuators contained in an optical head device as described above is subjected to shocks or vibrations caused by external force under a condition wherein the tracking actuator driving circuit 14 is in operation with the first power supply voltage V1 which is relatively low for the normal tracking servocontrol operation, the tracking error of the light beam impinging upon the optical disc could possibly suddenly increase so as to cause a relatively large noise contained in the tracking error signal Et which is supplied to the tracking actuator driving circuit 14. Consequently, the tracking actuator driving circuit 14 operating with the first power supply voltage V1 which is relatively low and therefore having an output dynamic range not so wide produces an output having a level limited to be constant in response to a large level portion of the noise contained in the tracking error signal Et, so that the tracking servocontrol can no longer be operated correctly and an undesirable track shift movement of the light beam impinging upon the optical disc, in which the light beam shifts or jumps to another record track adjacent to the former record track on the optical disc, is caused.

OBJECTS AND SUMMARY OF THE INVENTION

Accordingly, it is an object of the present invention to provide an actuator driving circuit for driving an actuator employed in a servocontrol system in accordance with an error signal obtained to be supplied to the circuit in the servocontrol system, which avoids the aforementioned problems encountered with the prior art.

Another object of the present invention is to provide an actuator driving circuit for driving an actuator employed in a servocontrol system in accordance with an error signal obtained to be supplied to the circuit in the servocontrol system, which is operative to drive the actuator appropriately with reduced power consumption under a normal operating condition and to be prevented from producing an output having a level limited to be constant in response to a large level portion of the error signal when a relatively large noise is contained in the error signal supplied thereto.

A further object of the present invention is to provide an actuator driving circuit for driving an actuator employed in a servocontrol system in accordance with an error signal obtained to be supplied to the circuit in the servocontrol system, which is supplied with a first power supply voltage which is relatively low for driving the actuator appropriately with reduced power consumption under a normal operating condition and with a second power supply voltage which is higher than the first power supply voltage for driving the actuator without producing an output having a level limited to be constant in response to a large level portion of the error signal when a relatively large noise is contained in the error signal supplied thereto.

According to the present invention, there is provided an actuator driving circuit for driving an actuator employed in a servocontrol system, the circuit comprising an input terminal to which an error signal obtained in the servocontrol system is supplied, an amplifier for amplifying the error signal supplied through the input terminal to produce a driving signal and for supplying the actuator with the driving signal, a power supply voltage source for producing a first power supply voltage and a second power supply voltage higher the first power supply voltage, a power supply voltage selector for selecting one of the first and second power supply voltages so as to supply the amplifier with the selected one of the voltages, a level detector for detecting a specific portion of the error signal having such a level as to cause the amplifier to produce a portion of the driving signal having a level limited to be constant under a condition in which the first power supply voltage is supplied to the amplifier and for producing a detection output by which the power supply voltage selector is controlled to select the second power supply voltage in place of the first power supply voltage when the specific portion of the error signal is detected.

In the actuator driving circuit thus constituted in accordance with the present invention, the amplifier is operative with the first power supply voltage supplied through the power supply voltage selector to amplify the error signal to produce the driving signal and supply the actuator with the driving signal and therefore the actuator is driven by the amplifier with reduced power consumption when the error signal does not contain the specific portion thereof which is to be detected by the level detector. Then, when the specific portion of the error signal having the level causing the amplifier to produce the portion of the driving signal having the level limited to be constant, which is contained in the error signal as a noise, is detected by the level detector under the condition wherein the amplifier is supplied with the first power supply voltage through the power supply voltage selector, the power supply voltage selector is changed by the detection output obtained from the level detector to select the second power supply voltage in place of the first power supply voltage and to supply the amplifier with the second power supply voltage which is higher than the first power supply voltage, so that the actuator is driven by the amplifier which is operative appropriately without producing the portion of the driving signal having the level limited to be constant.

The above, and other objects, features and advantages of the present invention will become apparent from the following detailed description which is to be read in conjunction with the accompanying drawings.

DESCRIPTION OF THE PREFERRED EMBODIMENTS

Figure 1:
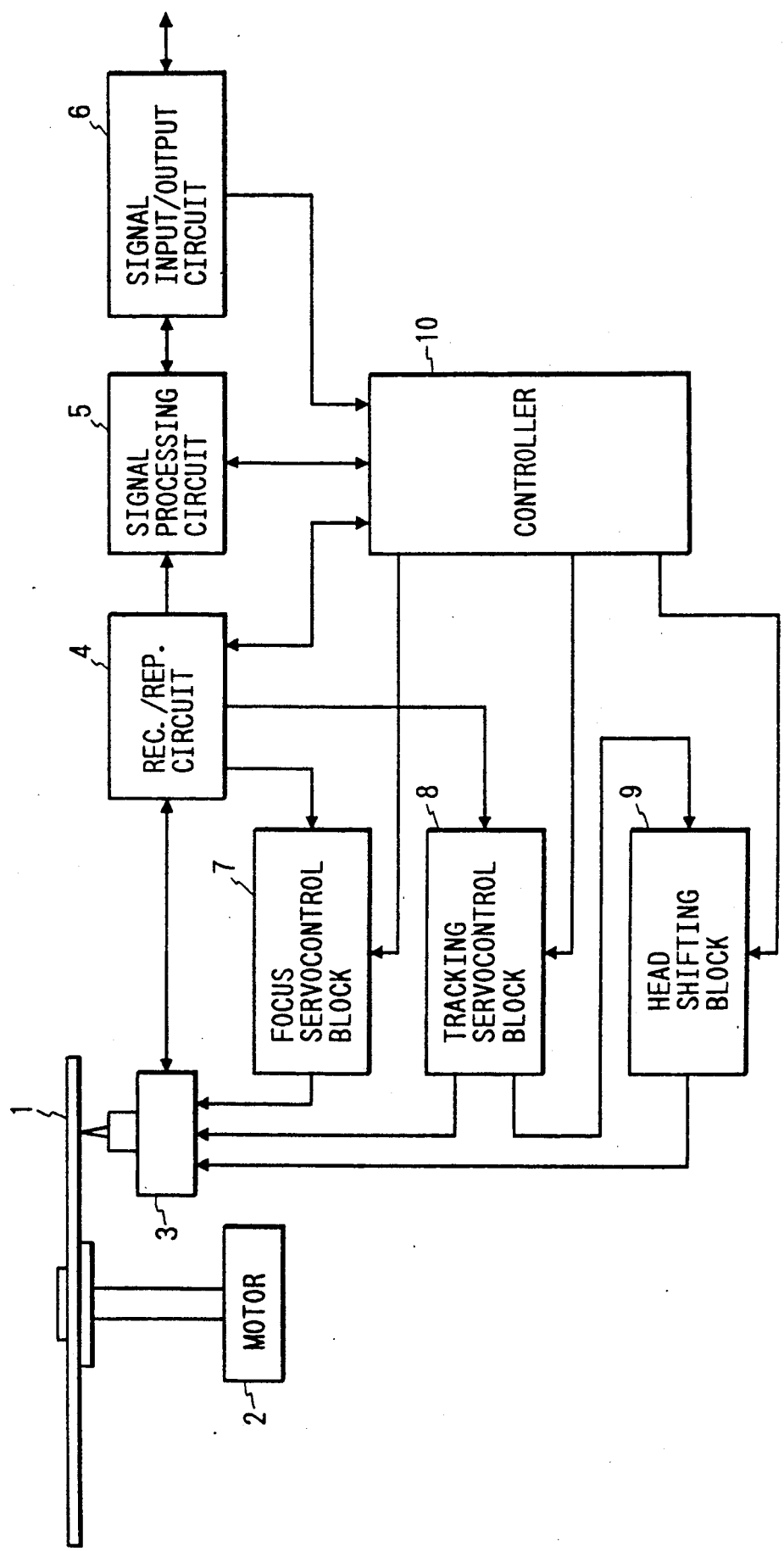
FIG. 1 is a schematic block diagram showing a conventional example of an optical disc recording and reproducing apparatus.
Figure 2:
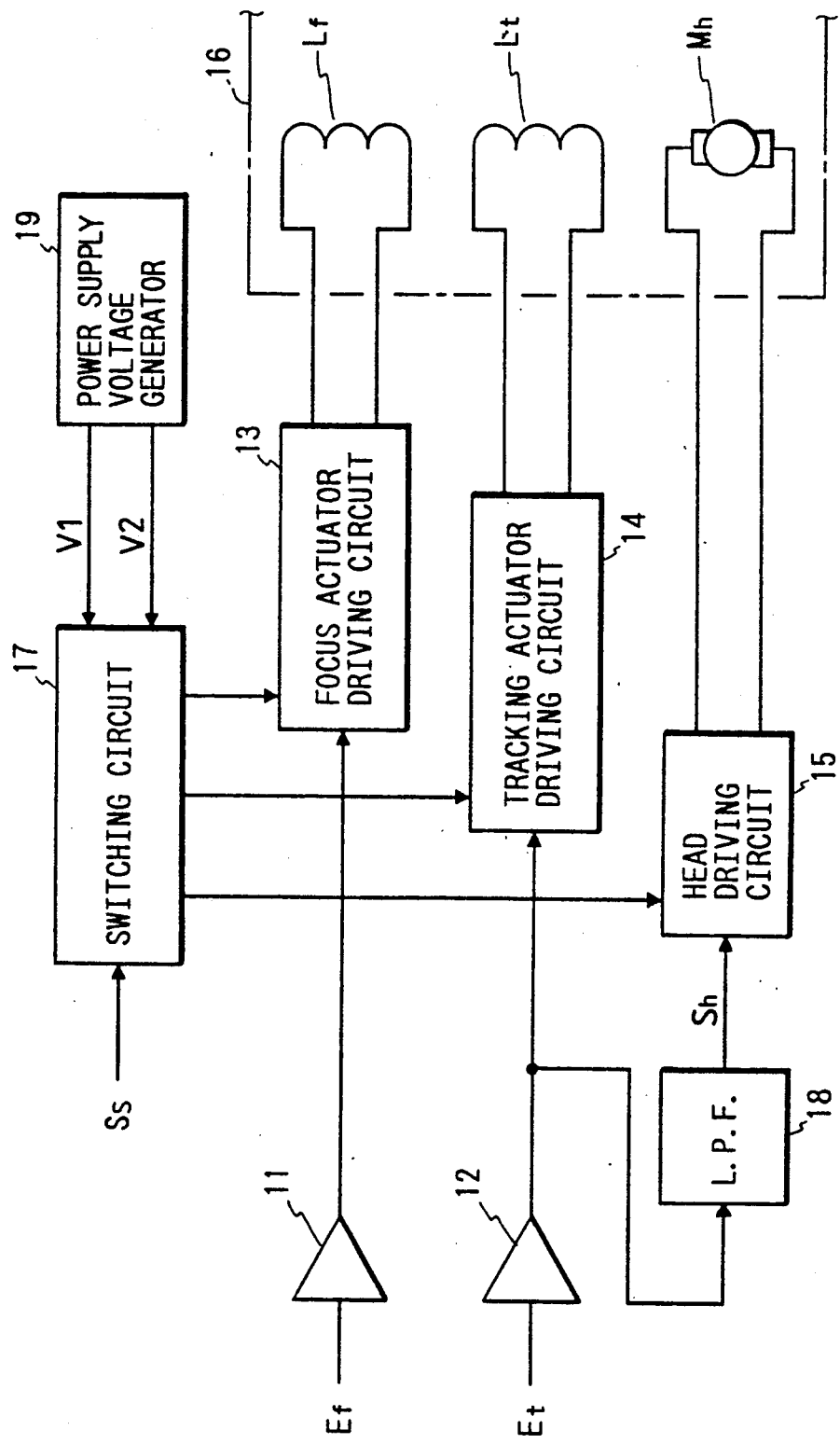
FIG. 2 is a schematic block diagram showing a circuit arrangement for driving actuators contained in an optical head device employed in an optical disc recording and reproducing apparatus, which has been proposed previously.
Figure 3:
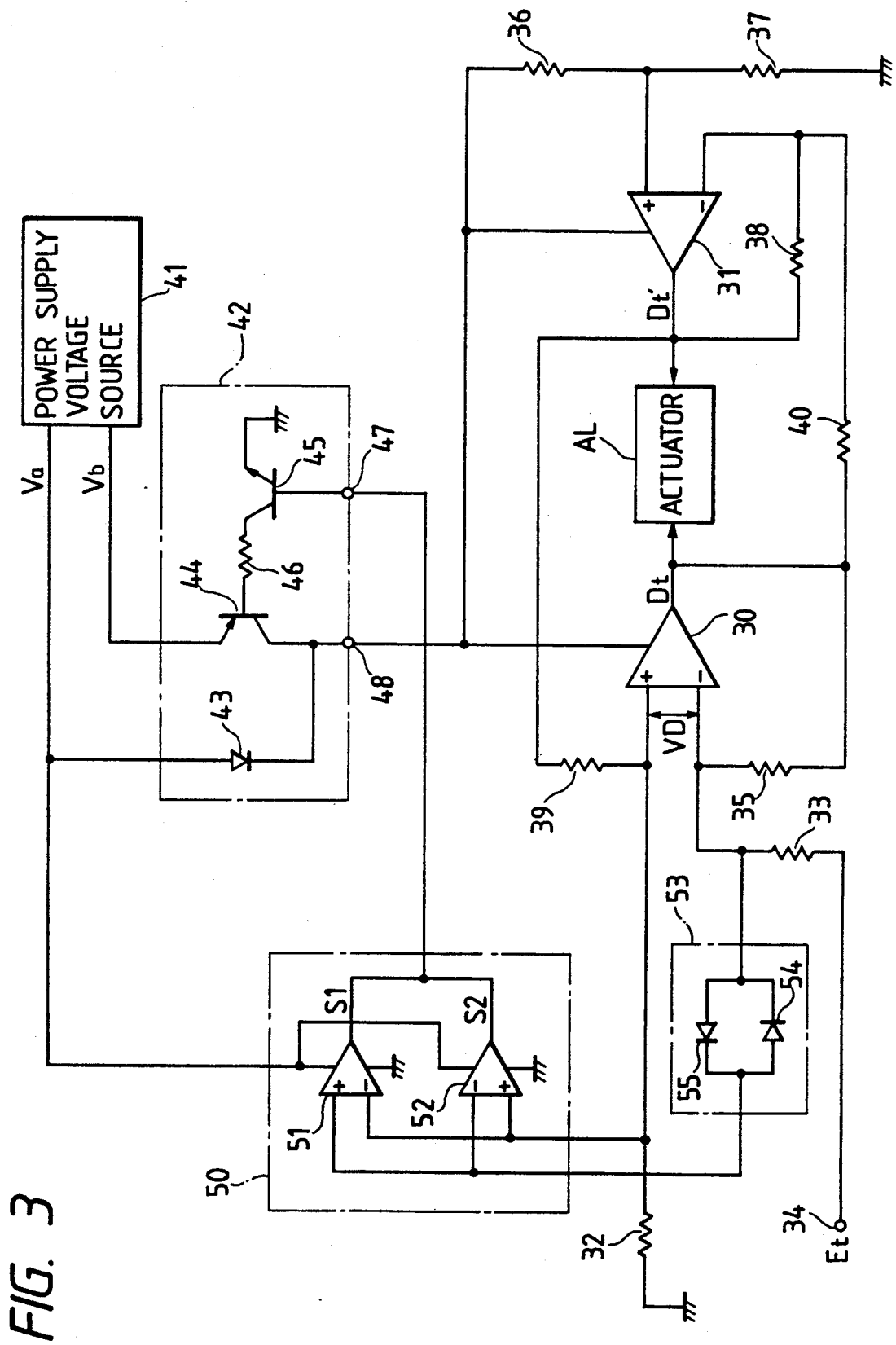
FIG. 3 is a schematic circuit diagram showing one embodiment of actuator driving circuit according to the present invention.

FIG. 3 shows one embodiment of actuator driving circuit according to the present invention, which is constituted as a tracking actuator driving circuit operative to drive an actuator contained in an optical head device of an optical disc recording and/or reproducing apparatus for tracking servocontrol.

Referring to FIG. 3, a couple of operational amplifiers 30 and 31 are provided to have respective output terminals connected with both ends of an actuator AL which is, for example, an electromagnetic coil for actuating an objective lens employed in an optical disc recording and/or reproducing apparatus, through which a light beam impinges upon an optical disc provided in the apparatus, for tracking servocontrol. A positive input terminal of the operational amplifier 30 is grounded through a resistor 32 and a negative input terminal of the operational amplifier 30 is connected through a resistor 33 to an error signal input terminal 34 to which a tracking error signal Et is supplied. Further, the output terminal of the operational amplifier 30 is connected through a resistor 35 to the negative input terminal for forming a feedback path.

A positive input terminal of the operational amplifier 31 is connected to a connection point between resistors 36 and 37 which are coupled in series with each other for forming a voltage divider. An output terminal of the operational amplifier 31 is connected through a resistor 38 to a negative input terminal of the operational amplifier 31 for forming a feedback path and also connected through a resistor 39 to the positive input terminal of the operational amplifier 30. Further, the output terminal of the operational amplifier 30 is connected through a resistor 40 to the negative input terminal of the operational amplifier 31.

A power supply voltage source 41 is provided for producing a first power supply voltage Va which is relatively low so as to be, for example, 5 V and a second power supply voltage Vb which is higher than the first power supply voltage Va so as to be, for example, 12 V. The first and second power supply voltages Va and Vb are supplied to a power supply voltage selector 42. The power supply voltage selector 42 is composed of a diode 43 to which the first power supply voltage Va is fed, a first switching transistor 44 to which the second power supply voltage Vb is fed, and a second switching transistor 45 connected through a resistor 46 to the first switching transistor 44, and operative to select one of the first and second power supply voltages Va and Vb in accordance with a control signal supplied to a control input terminal 47 connected to a base of the second switching transistor 45 and to render the first or second power supply voltage Va or Vb selected thereby to a voltage output terminal 48 connected to both of the diode 43 and the first switching transistor 44.

The first or second power supply voltage Va or Vb obtained from the voltage output terminal 48 of the power supply voltage selector 42 is supplied to the operational amplifiers 30 and 31 so that each of the operational amplifiers 30 and 31 operates with the first or second power supply voltage Va or Vb which is also supplied to the voltage divider formed by the resistors 36 and 37.

A level detector 50 which comprises first and second level comparators 51 and 52 is provided for detecting a specific portion of the tracking error signal Et having such a level as to cause the operational amplifier 30 to produce an output signal having a level limited to be constant under a condition wherein the first power supply voltage Va is selected to be supplied to the operational amplifier 30. The first level comparator 51 has a reference terminal connected to the positive input terminal of the operational amplifier 30, a comparing terminal connected through a threshold level generator 53 which is composed of diodes 54 and 55 connected in parallel with each other with respective opposite polarities to the negative input terminal of the operational amplifier 30, and an output terminal connected to the control input terminal 47 of the power supply voltage selector 42. The second level comparator 52 has a reference terminal connected through the threshold level generator 53 to the negative input terminal of the operational amplifier 30, a comparing terminal connected to the positive input terminal of the operational amplifier 30, and an output terminal connected to the control input terminal 47 of the power supply voltage selector 42. Each of the first and second level comparators 51 and 52 is supplied with the second power supply voltage Vb from the power supply voltage source 41.

In the configuration thus constituted, the operational amplifier 30 is operative to amplify the tracking error signal Et which is supplied through the resistor 33 to the negative input terminal from the error signal input terminal 34 to produce a drive signal Dt at its output terminal and to supply one end of the actuator AL with the driving signal Dt. The resistors 38 and 40 are selected to have the same resistance value and therefore the operational amplifier 31 is operative to produce at its output terminal an output signal Dt' which corresponds to a signal obtained by inverting the driving signal Dt in polarity and to supply the other end of the actuator AL with the output signal Dt'. Further, the resistors 36 and 37 are also selected to have the same resistance value and therefore the positive input terminal of the operational amplifier 31 is supplied with a voltage corresponding to a half of the first or second power supply voltage Va or Vb. Consequently, a DC potential at each of the output terminals of the operational amplifiers 30 and 31, that is, each of both ends of the actuator AL is set to be a half of the first or second power supply voltage Va or Vb. As a result, the actuator AL is driven for performing the tracking servocontrol by a current flowing through the actuator AL from one end thereof to the other end thereof and vice versa in accordance with the driving signal Dt.

Figure 4A:
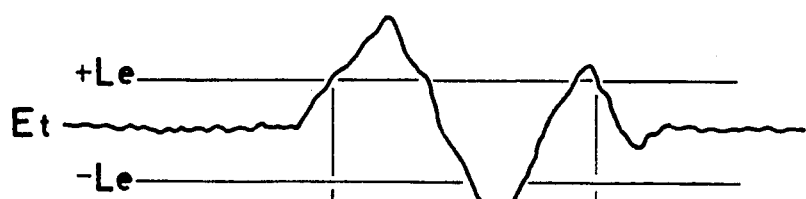
FIGS. 4A and 4B are waveform diagrams used for explaining the operation of the embodiment shown in FIG. 3.

When the tracking error signal Et does not contain the specific portion thereof having the level which causes the operational amplifier 30 to produce the output signal having the level limited to be constant under the condition wherein the first power supply voltage Va is selected to be supplied to the operational amplifier 30, as shown in a period before a time point T1 or a period after a time point T2 in FIG. 4A, the operational amplifier 30 operates correctly to produce the driving signal Dt which has the level varying in response to variations in the level of the tracking error signal Et, as shown in the period before the time point T1 or the period after the time point T2 in FIG. 4A, and therefore voltage levels at the positive and negative input terminals of the operational amplifier 30 are equal to each other. Consequently, the first level comparator 51 in the level detector 50 produces a comparison output signal S1 having a low level and similarly the second level comparator 52 in the level detector 50 produces a comparison output signal S2 having a low level.

These comparison output signals S1 and S2 each having the low level are supplied to the control input terminal 47 of the power supply voltage selector 42 as the control signal and each of the first and second switching transistors 44 and 45 of the power supply voltage selector 42 is kept in its OFF state because each of the comparison output signals S1 and S2 has the low level. As a result, the first power supply voltage Va obtained from the power supply voltage source 41 is continuously supplied through the diode 43 and the voltage output terminal 48 of the power supply voltage selector 42 to the operational amplifiers 30 and 31 and the voltage divider formed with the resistors 36 and 37. That is, the first power supply voltage Va is selected by the power supply voltage selector 42 to be supplied to the operational amplifiers 30 and 31 and the voltage divider formed with the resistors 36 and 37 and therefore the circuit is operative to drive the actuator AL with reduced power consumption.

Figure 4B:
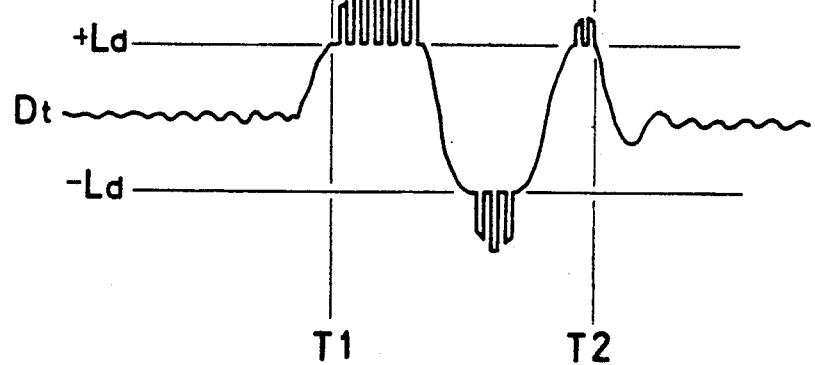

On the other hand, in the case where the tracking error signal Et containing the specific portion thereof having the level which causes the operational amplifier 30 to produce the output signal having the level limited to be constant under the condition wherein the first power supply voltage Va is selected to be supplied to the operational amplifier 30, as shown in a period between the time points T1 and T2 in FIG. 4A, is supplied to the error signal input terminal 34 when the operational amplifiers 30 and 31 operate actually with the first power supply voltage Va, the operational amplifier 30 operates incorrectly to produce the driving signal Dt which has a level limited to be constant (+Ld or −Ld) when the level of the tracking error signal Et increases to exceed a positive level +Le or decreases to exceed a negative level −Le, as shown in FIGS. 4A and 4B. With such an incorrect operation of the operational amplifier 30, the voltage levels at the positive and negative input terminals of the operational amplifier 30 become different from each other to produce a voltage difference VD between the positive and negative input terminals of the operational amplifier 30. When the voltage difference VD exceeds a voltage required to cause the threshold level generator 53 to produce a predetermined threshold voltage level, for example, ±0.6 V, the first level comparator 51 in the level detector 50 produces the comparison output signal S1 having a high level or the second level comparator 52 in the level detector 50 produces the comparison output signal S2 having a high level.

In such a case also, the comparison output signals S1 and S2 each having the high level selectively are supplied to the control input terminal 47 of the power supply voltage selector 42 as the control signal. When the comparison output signal S1 having the high level or the comparison output signal S2 having the high level is supplied to the control input terminal 47, the second switching transistor 45 of the power supply voltage selector 42 is turned on and thereby the first switching transistor 44 of the power supply voltage selector 42 is also turned on. As a result, the second power supply voltage Vb obtained from the power supply voltage source 41 is supplied through the first switching transistor 44 and the voltage output terminal 48 of the power supply voltage selector 42 to the operational amplifiers 30 and 31 and the voltage divider formed with the resistors 36 and 37, in place of the first power supply voltage Va. That is, the second power supply voltage Vb higher than the first power supply voltage Va is selected by the power supply voltage selector 42 to be supplied to the operational amplifiers 30 and 31 and the voltage divider formed with the resistors 36 and 37. Such a change from the first power supply voltage Va to the second power supply voltage Vb in relation to the operational amplifiers 30 and 31 and the voltage divider formed with the resistors 36 and 37 is carried out at a time delayed by a certain short period from the time at which the voltage difference VD exceeds the voltage required to cause the threshold level generator 53 to produce the predetermined threshold level.

Then, the operational amplifier 30 which has been supplied with the second power supply voltage Vb operates again correctly to produce the driving signal Dt which has a level in excess of the positive level +Ld or the negative level −Ld and varying in response to variations in the level of the tracking error signal Et, as shown in the period between the time T1 and T2 in FIG. 4A, and the operational amplifier 31 which has been supplied with the second power supply voltage Vb also operates correctly to produce the output signal Dt'. Therefore, the actuator AL is driven correctly in accordance with the tracking error signal Et so that the tracking servocontrol is effectively performed for preventing an undesirable track shift movement of the light beam impinging upon the optical disc.

With such a correct operation of the operational amplifier 30, the voltage levels at the positive and negative input terminals of the operational amplifier 30 become equal to each other again, and therefore, the first level comparator 51 in the level detector 50 produces the comparison output signal S1 having the low level and similarly the second level comparator 52 in the level detector 50 produces the comparison output signal S2 having the low level. This results in that the second switching transistor 45 of the power supply voltage selector 42 is turned off and thereby the first switching transistor 44 of the power supply voltage selector 42 is also turned off, and as a result, the first power supply voltage Va is selected by the power supply voltage selector 42 to be supplied to the operational amplifiers 30 and 31 and the voltage divider formed with the resistors 36 and 37, in place of the second power supply voltage Vb. The change from the second power supply voltage Vb to the first power supply voltage Va in relation to the operational amplifiers 30 and 31 and the voltage divider formed with the resistors 36 and 37 is also carried out at a time delayed by a certain short period from the time at which the voltage difference VD becomes zero.

Such changes from the first power supply voltage Va to the second power supply voltage Vb and from the second power supply voltage Vb to the first power supply voltage Va in relation to the operational amplifiers 30 and 31 and the voltage divider formed with the resistors 36 and 37 as described above may be repeated in accordance with variations in the level of the tracking error signal Et, and the light beam impinging upon the optical disc is maintained in correct tracking relation to record tracks on the optical disc.

Figure 5:
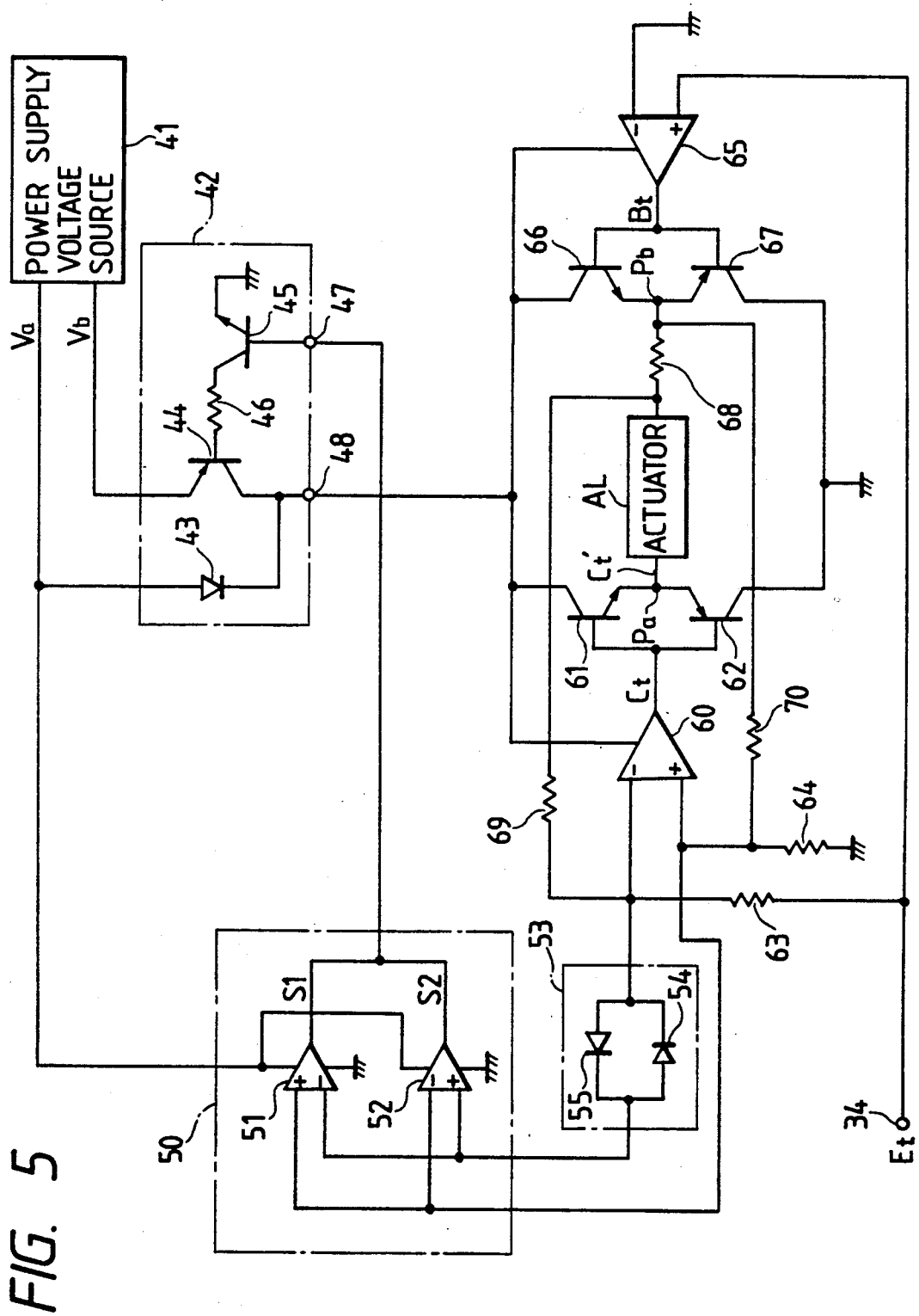
FIG. 5 is a schematic circuit diagram showing another embodiment of actuator driving circuit according to the present invention.

FIG. 5 shows another embodiment of actuator driving circuit according to the present invention, which is also constituted as a tracking actuator driving circuit operative to drive an actuator contained in an optical head device of an optical disc recording and/or reproducing apparatus for tracking servocontrol. In FIG. 5, elements, parts and blocks corresponding to those of FIG. 3 are marked with the same references and further description thereof will be omitted.

Referring to FIG. 5, an operational amplifier 60 is provided to have an output terminal thereof connected to bases of a pair of power amplifying transistors 61 and 62 having respective collector-emitter paths coupled in series through a connection point Pa and connected between a voltage output terminal 48 of a power supply voltage selector 42 and the ground. A negative input terminal of the operational amplifier 60 is connected through a resistor 63 to an error signal input terminal 34 and a positive input terminal of the operational amplifier 60 is grounded through a resistor 64. A first power supply voltage Va or a second power supply voltage Vb is supplied to the operational amplifier 60 from the voltage output terminal 48 of the power supply voltage selector 42. Further, a level comparator 65 is provided to have an output terminal thereof connected to bases of a pair of switching transistors 66 and 67 having respective collector-emitter paths coupled in series through a connection point Pb and connected between the voltage output terminal 48 of the power supply voltage selector 42 and the ground. A reference terminal of the level comparator 65 is grounded and a comparing terminal of the level comparator 65 is connected to the error signal input terminal 34. The first power supply voltage Va or the second power supply voltage Vb is supplied to the level comparator 65 from the voltage output terminal 48 of the power supply voltage selector 42. A series connection of an actuator AL and a resistor 68 is connected between the connection points Pa and Pb. One end of the resistor 68 is connected through a resistor 69 to the negative input terminal of the operational amplifier 60 and the other end of the resistor 68 is connected through a resistor 70 to the positive input terminal of the operational amplifier 60.

A first level comparator 51 of a level detector 50 has a reference terminal connected through a threshold level generator 53 which is composed of diodes 54 and 55 to the negative input terminal of the operational amplifier 60, a comparing terminal connected to the positive input terminal of the operational amplifier 60, and an output terminal connected to the control input terminal 47 of the power supply voltage selector 42. A second level comparator 52 of the level detector 50 has a reference terminal connected to the positive input terminal of the operational amplifier 60, a comparing terminal connected through the threshold level generator 53 to the negative input terminal of the operational amplifier 60, and an output terminal connected to the control input terminal 47 of the power supply voltage selector 42. Each of the first and second level comparators 51 and 52 is supplied with the second power supply voltage Vb from a power supply voltage source 41.

In the configuration thus constituted, the operational amplifier 60 is operative to amplify a tracking error signal Et which is supplied through the resistor 63 to the negative input terminal from the error signal input terminal 34 to produce a drive signal Ct at its output terminal and to supply both of the bases of the power amplifying transistors 61 and 62 with the driving signal Ct. The power amplifying transistors 61 and 62 which are supplied with a first or second power supply voltage Va or Vb through the power supply voltage selector 42 are operative to produce an amplified driving signal Ct' at the connection point Pa which is provided with a DC potential of a half of the first or second power supply voltage Va or Vb. The level comparator 65 is operative to produce an output signal Bt which has a high level when the tracking error signal Et has a positive level and a low level when the tracking error signal Et has a negative level and to supply both of the bases of the switching transistors 66 and 67 with the output signal Bt. The switching transistor 66 is made conductive so that the connection point Pb is coupled through the switching transistor 66 to the voltage output terminal 48 of the power supply voltage selector 42 when the output signal Bt has the high level and nonconductive when the output signal Bt has the low level, while the switching transistor 67 is made nonconductive when the output signal Bt has the high level and conductive so that the connection point Pb is grounded through the switching transistor 67 when the output signal Bt has the low level. Accordingly, the actuator AL is driven for performing the tracking servocontrol by a current flowing through the actuator AL from the connection point Pb to the connection point Pa in accordance with the amplified driving signal Ct' when the tracking error signal Et has the positive level and from the connection point Pa to the connection point Pb in accordance with the amplified driving signal Ct' when the tracking error signal Et has the negative level. The resistor 68 produces a voltage corresponding to the current flowing through the actuator and fed back to the operational amplifier 60.

The first and second level comparators 51 and 52 in the level detector 50 produce respective comparison output signals S1 and S2 each having a low level when the tracking error signal Et does not contain a specific portion thereof having the level which causes the operational amplifier 60 to produce a portion of the amplified driving signal Ct' having a level limited to be constant under a condition wherein the first power supply voltage Va is selected to be supplied to the operational amplifier 60 and a high level when the tracking error signal Et contains the specific portion thereof in the same manner as those in the embodiment shown in FIG. 3. Each of the comparison output signals S1 and S2 is supplied to the control input terminal 47 of the power supply voltage selector 42 as a control signal and thereby the power supply voltage selector 42 is controlled so as to select one of the first and second power supply voltages Va and Vb from the power supply voltage source 41 and supply the power amplifying transistors 61 and 62, the switching transistors 66 and 67, the operational amplifier 60 and the level comparator 65 with the first or second power supply voltage Va or Vb selected in accordance with each of the comparison output signals S1 and S2.

In the embodiment shown in FIG. 5 also, the actuator AL is driven with reduced power consumption when the tracking error signal Et does not contain the above mentioned specific portion thereof and a light beam impinging upon an optical disc is maintained in correct tracking relation to record tracks on the optical disc when the tracking error signal Et contains the above mentioned specific portion thereof.

What is claimed is:

1. An actuator driving circuit for driving an actuator employed in a servocontrol system, the circuit comprising:

an error signal input terminal to which an error signal obtained in the servocontrol system is supplied, amplifying means for amplifying the error signal supplied through said error signal input terminal to produce a driving signal and for supplying said driving signal to the actuator, power supply voltage source means for producing a first power supply voltage and a second power supply voltage higher than said first power supply voltage, power supply voltage selecting means for selecting one of the first and second power supply voltages so as to supply said amplifying means with said one of the first and second power supply voltages selected, and level detecting means for detecting a specific portion of the error signal having such a level as to cause said amplifying means to produce a portion of the driving signal having a level limited to be constant under a condition in which said first power supply voltage is supplied to said amplifying means and for producing a detection output by which said power supply voltage selecting means is controlled to select said second power supply voltage in place of said first power supply voltage when said specific portion of the error signal is detected, thereby enabling the circuit to compensate for shocks and vibrations caused by external force.

2. An actuator driving circuit according to claim 1, wherein said amplifying means comprises an operational amplifier having a pair of input terminals, one of said pair of input terminals being supplied with the tracking error signal.

3. An actuator driving circuit according to claim 2, wherein said level detecting means is connected to said pair of input terminals of the operational amplifier so as to detect a level of a voltage difference between said pair of input terminals and is further connected to said power supply voltage selecting means so as to supply said power supply voltage selecting means with a detection output of the level of said voltage difference.

4. An actuator driving circuit according to claim 3, wherein said level detecting means comprises a first level comparator for comparing a voltage level at one of said pair of input terminals with a voltage level at the other of said pair of input terminals and a second comparator for comparing the voltage level at said other of said pair of input terminals with the voltage level at said one of said pair of input terminals and an output terminal of each of said first and second level comparators is connected to said power supply voltage selecting means.

5. An actuator driving circuit according to claim 3, wherein said level detecting means is connected directly to one of said pair of input terminals of the operational amplifier and connected through threshold level generating means to the other of said pair of input terminals of the operational amplifier.

6. An actuator driving circuit according to claim 2, wherein said amplifying means further comprises a pair of power amplifying transistors having respective collectoremitter paths connected in series with a connection point therebetween coupled with said actuator.

7. An actuator driving circuit according to claim 6, wherein said pair of power amplifying transistors are connected to said power supply voltage selecting means so as to be supplied with said first and second power supply voltages selectively.

8. An actuator driving circuit according to claim 7, wherein said level detecting means is connected to said pair of input terminals of the operational amplifier so as to detect a level of a voltage difference between said pair of input terminals and is further connected to said power supply voltage selecting means so as to supply said power supply voltage selecting means with a detection output of the level of said voltage difference.

9. An actuator driving circuit according to claim 1, wherein said power supply voltage selecting means comprises a switching device controlled by the detection output obtained from said level detecting means to be made conductive for selecting the second power supply voltage and supplying said amplifying means with said second power supply voltage selected.

* * * * *